United States Patent
Battat et al.

(10) Patent No.: US 10,714,954 B2
(45) Date of Patent: Jul. 14, 2020

(54) PORTABLE SWITCHING POWER SUPPLY WITH ATTACHABLE BATTERY PACK AND ENCLOSURE

(71) Applicant: POWERTEC SOLUTIONS INTERNATIONAL LLC, Franklin, KY (US)

(72) Inventors: Stanley Battat, Hollywood, FL (US); Drew M. Hardin, Nashville, TN (US)

(73) Assignee: POWERTEC SOLUTIONS INTERNATIONAL LLC, Franklin, KY (US)

(*) Notice: Subject to any disclaimer, the term of this patent is extended or adjusted under 35 U.S.C. 154(b) by 0 days.

(21) Appl. No.: 16/799,343

(22) Filed: Feb. 24, 2020

(65) Prior Publication Data

US 2020/0195026 A1    Jun. 18, 2020

Related U.S. Application Data

(63) Continuation of application No. 14/864,149, filed on Sep. 24, 2015, now Pat. No. 10,637,264.

(60) Provisional application No. 62/054,495, filed on Sep. 24, 2014.

(51) Int. Cl.
    *H02J 7/00*    (2006.01)

(52) U.S. Cl.
    CPC .......... *H02J 7/0044* (2013.01); *H02J 7/0024* (2013.01); *H02J 7/0068* (2013.01)

(58) Field of Classification Search
    CPC .... H02J 9/061; H02J 9/062; H02J 1/10; H02J 7/0044; H02J 7/0024; H02J 7/0068

USPC .................................................... 307/64–66
See application file for complete search history.

(56) References Cited

U.S. PATENT DOCUMENTS

| | | | | |
|---|---|---|---|---|
| 4,996,628 A * | 2/1991 | Harvey | ................ | H05K 7/1454 248/679 |
| 5,369,565 A * | 11/1994 | Chen | ..................... | H02J 7/0042 224/902 |
| 5,563,493 A * | 10/1996 | Matsuda | ................. | G06F 1/263 320/124 |
| 5,616,968 A * | 4/1997 | Fujii | ......................... | H02J 3/38 307/150 |
| 5,652,499 A * | 7/1997 | Morita | ................ | H01M 2/1066 320/112 |
| 5,867,007 A * | 2/1999 | Kim | ..................... | H02J 7/0024 320/118 |
| 6,121,695 A * | 9/2000 | Loh | .......................... | G06F 1/26 307/64 |
| 6,188,200 B1 * | 2/2001 | Maiorano | ............... | H02J 3/005 320/132 |
| 6,271,605 B1 * | 8/2001 | Carkner | ................ | H02J 7/0031 307/125 |

(Continued)

*Primary Examiner* — Alfonso Perez Borroto
(74) *Attorney, Agent, or Firm* — Robert M. Schwartz; Kerry P. Sisselman (57) ABSTRACT

A switchable direct current voltage power supply for powering a device having an uninterruptible power supply with additional standby power capacity where the switching power supply has a power input and a power output for powering a device with a first battery pack attachable to the switching power supply for providing power to the device when the power input fails and a second battery pack attachable to the first power supply providing additional standby power capacity and where the attachable battery pack utilizes lithium chemistry.

16 Claims, 8 Drawing Sheets

(56) References Cited

U.S. PATENT DOCUMENTS

| | | | | |
|---|---|---|---|---|
| 6,274,950 B1* | 8/2001 | Gottlieb | G01R 31/3648 | 307/66 |
| 6,522,030 B1* | 2/2003 | Wall | H02J 3/46 | 307/43 |
| 6,586,850 B1* | 7/2003 | Powers | A61N 1/3975 | 307/150 |
| 6,736,658 B2* | 5/2004 | Milan | G06F 13/4095 | 363/146 |
| 7,177,168 B2* | 2/2007 | Toyomura | H01R 13/7039 | 363/131 |
| 7,378,756 B2* | 5/2008 | Singer | H01R 13/652 | 307/140 |
| 7,495,415 B2* | 2/2009 | Kanouda | G06F 1/30 | 307/66 |
| 7,508,093 B2* | 3/2009 | Wiedemuth | H01J 37/32577 | 307/147 |
| 7,528,579 B2* | 5/2009 | Pacholok | H02J 7/022 | 320/145 |
| 7,737,580 B2* | 6/2010 | Hjort | H02J 7/0047 | 307/46 |
| 7,786,703 B2* | 8/2010 | Nakao | G01R 31/396 | 320/149 |
| 7,855,528 B2* | 12/2010 | Lee | H02J 2207/40 | 320/107 |
| D632,649 S * | 2/2011 | Scheucher | D13/110 | |
| 7,990,102 B2* | 8/2011 | Scheucher | H01M 10/6557 | 320/107 |
| 8,029,311 B2* | 10/2011 | Ohshima | H01M 2/30 | 439/374 |
| 8,116,105 B2* | 2/2012 | Klikic | H02J 9/062 | 363/132 |
| 8,217,530 B2* | 7/2012 | Lu | H02J 7/34 | 307/52 |
| 8,278,781 B2* | 10/2012 | Yamashita | H01M 10/44 | 307/125 |
| 8,351,230 B2* | 1/2013 | Nishihara | H02M 1/08 | 363/21.02 |
| 8,541,985 B1* | 9/2013 | Wong | G06F 1/1632 | 320/140 |
| 8,547,061 B1* | 10/2013 | Wong | H02J 7/0027 | 320/112 |
| 8,803,361 B2* | 8/2014 | Johansen | H02J 9/062 | 307/64 |
| 8,853,887 B2* | 10/2014 | Silberbauer | H02J 9/062 | 307/64 |
| 8,876,540 B2* | 11/2014 | Lavender | H01M 2/1066 | 439/140 |
| 9,345,156 B2* | 5/2016 | Ogura | H02J 2207/20 | |
| 9,484,742 B2* | 11/2016 | Skallerud | H02J 1/10 | |
| 9,641,002 B2* | 5/2017 | Lavender | H02J 1/10 | |
| 9,653,719 B2* | 5/2017 | Lavender | H01M 2/204 | |
| 9,673,625 B2* | 6/2017 | Yamada | H02J 7/35 | |
| 9,801,293 B2* | 10/2017 | Fornage | H05K 5/0204 | |
| 9,899,835 B2* | 2/2018 | Mino | H02J 1/102 | |
| 10,044,288 B2* | 8/2018 | Dong | H01R 31/06 | |
| 2003/0220026 A1* | 11/2003 | Oki | H02J 7/34 | 439/894 |
| 2004/0164708 A1* | 8/2004 | Veselic | H02J 7/0068 | 320/132 |
| 2005/0225914 A1* | 10/2005 | King | H02J 9/061 | 361/62 |
| 2006/0056142 A1* | 3/2006 | Takahashi | G11B 33/142 | 361/679.33 |
| 2006/0277420 A1* | 12/2006 | Nguyen | G06F 1/263 | 713/300 |
| 2009/0296442 A1* | 12/2009 | Chang | H02J 9/062 | 363/142 |
| 2012/0028105 A1* | 2/2012 | Kumar | H01M 10/0525 | 429/149 |
| 2012/0121944 A1* | 5/2012 | Yamamoto | H01M 2/344 | 429/7 |
| 2013/0130083 A1* | 5/2013 | Park | H01M 10/0525 | 429/94 |
| 2013/0326237 A1* | 12/2013 | Holdengreber | H02J 9/061 | 713/300 |
| 2014/0028103 A1* | 1/2014 | Lai | H02J 7/0031 | 307/80 |

* cited by examiner

PORTABLE SWITCHING POWER SUPPLY WITH ATTACHABLE BATTERY PACK AND ENCLOSURE

CROSS-REFERENCE TO RELATED APPLICATIONS

This application is a continuation of U.S. Patent Application Ser. No. 14/864,149, filed Sep. 24, 2015 and entitled Portable Switching Power Supply with Attachable Battery Pack and Enclosure, which claims the benefit of U.S. Provisional Application Ser. No. 62/054,495, filed on Sep. 24, 2014, entitled Universal Enclosure for Optical Network and Circuit, the prior applications herewith incorporated by reference in their entireties.

BACKGROUND OF THE INVENTION:

The present invention is a portable switching direct current voltage power supply used at least in the telecommunications industry where low-voltage direct current devices require a switching power supply to step down the voltage from a standard one hundred ten (110) volt alternating current, or other voltage source, to 12 volt direct-current, or other desired step down voltage. Additionally these devices use uninterruptible power backup systems so that in the event of a power failure they continue to operate in order to provide continued telecommunication services or other services from the respective devices to the public.

Field Of The Invention:

The present invention is directed to offer new efficiencies in the field of telecommunications for size, scalabilty and functionality, by allowing an end user the capability to install anywhere within the premises, as a wall mount, desktop mount or floor mount, as well as allow for a stand-alone power supply or scalable uninterruptable power supply with optional stackable Li Ion (lithium ion) battery packs for customized battery backup availability.

The provided solution is the first to integrate a network solution to both provide a universal housing for a telecommunication's Customer Premises Equipment (CPE) device and also incorporate a switching Vdc (direct current voltage) power supply with optional battery packs utilizing lithium chemistry.

The provided solution offers alarm communication to the accepting CPE device and intelligent push button Vdc disconnection to the CPE in order to reset Vdc power to the CPE device rather than disconnecting cables or removing the battery pack to reset Vdc (output) power.

The switching Vdc power supply allows for attachment of one or multiple exterior attachable, removable and replaceable Li Ion battery pack(s) (also referred to herein as stackable) protecting the end user from traditional short circuit connections or crossing terminal wires during installation.

The switching Vdc power supply offers the only portable solution utilizing an attachable/removable battery pack comprised of a lithium chemistry power supply.

The universal enclosure is the only CPE device all-in-one enclosure to offer movable components that allow multiple manufactured CPE devices the ability to fit into the CPE device cavity of the enclosure and fit securely as well as house the custom switching Vdc power supply with optional attached Li Ion battery pack and ability to store and protect multiple input and output premises cables. The universal enclosure is also the only CPE device enclosure to offer a cavity designed specifically for a switching Vdc power supply and optional attached Li Ion battery pack, whereas all past solutions must use a detached switching Vdc power supply and installed sealed lead acid (SLA) battery, mounted separately from the CPE device and/or enclosure. Altogether, the universal enclosure is the first to offer installation of various manufactured CPE devices, fiber and cable management, and switching Vdc power supply and optional attached Li Ion battery pack all in one enclosure with no exposed wiring tying the switching Vdc power supply and optional attached Li Ion battery pack to the CPE device, when the protective cover is installed.

The switching Vdc power supply is also unique by offering push button reset Vdc power and alarm communications to the CPE device. The universal enclosure provides a convenient access door to initiate reset and alarm silence functions on the switching Vdc power supply.

Description of the Related Art:

Traditional products include installation of CPE device with or without the device housing and offers no universal movement unspecific to the individually manufactured CPE device.

SUMMARY OF THE INVENTION:

A portable switching Vdc power supply is provided with attachable Li Ion battery pack(s) designed for powering and providing "scalable" levels of standby battery backup to Customer Premises Equipment (CPE) devices. The switching Vdc power supply can operate as a stand-alone power supply to any accepting 12Vdc Customer Premises Equipment device and also operate as a "Uninterruptable Power Supply" (UPS) when partnering Li Ion battery pack(s) are connected and operational. The switching Vdc power supply with attachable Li Ion battery pack(s) is designed to offer the world's smallest portable telecommunications Uninterruptable Power Supply and the world's only solution to allow the customer the ability to add additional, "stackable" Li Ion battery packs for additional standby power capacity as required per installation. Together with one or multiple Li Ion battery packs, the switching Vdc power supply offers the only solution to utlilize stackable battery packs utilizing Lithium Chemistry. The switching Vdc power supply with attachable Li Ion battery pack can be installed with accompanying universal enclosure to house switching Vdc power supply with attached Li Ion battery pack, CPE device and all input and output cable management.

DESCRIPTION OF THE PREFERRED EMBODIMENTS:

In reference to the drawings and, in particular, FIGS. 1, 1A-1D, the switching Vdc power supply 10 allows for optional attachable Li Ion battery pack(s) 30, also known as power pack(s).

In reference to the drawings and, in particular, FIG. 1, 1A-1D, the switching Vdc power supply allows for the following Control Function Buttons 11:

Cold Start button 12—Ability to boot the switching Vdc power supply off an attached Li Ion battery pack when no Vac power is present, nor previously existing standby battery power.

Alarm Silence button 13—Ability to silence audible battery alarming initiated from "low battery, no battery or on battery."

N.I.R. Reset switch 14—"Network Interface Reset", allows for Vdc output "push button" disconnect. This function resets Vdc output the CPE device by holding "red" N.I.R. Button down for 3 seconds and releasing. The cold start switch 51 allows the power supply to cold start power off battery pack when alternating current line power is not present and new or replacement pack is connected. Alarm silence switch 13, 52 disables audible alarm function. Pressing and releasing the switch disables the audible alarm for 24 hours. Pressing and holding again for 15 seconds disables the audible alarm indefinitely. Pressing and holding the switch for another 15 seconds re-enables the audible alarm function.

Figure 1:
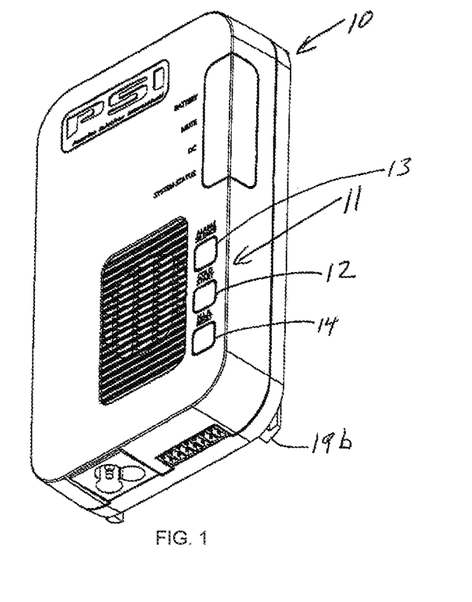
FIG. 1 is a perspective view of the switching Vdc power supply showing alarming/status LEDs and control push buttons namely, CPE reset button, alarm silence, and cold start buttons.
Figure 1A:
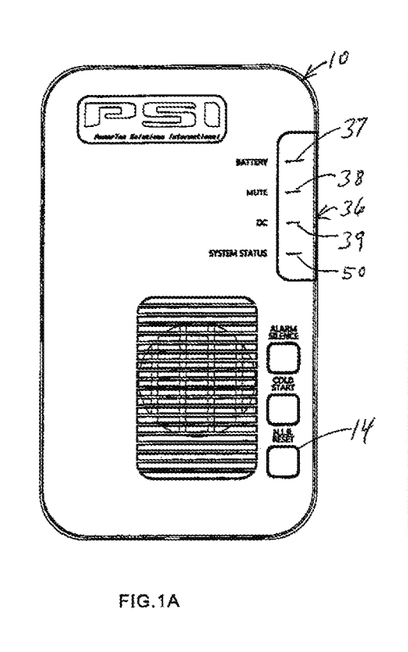
FIG. 1A is a front view of the switching Vdc power supply.
Figure 1B:
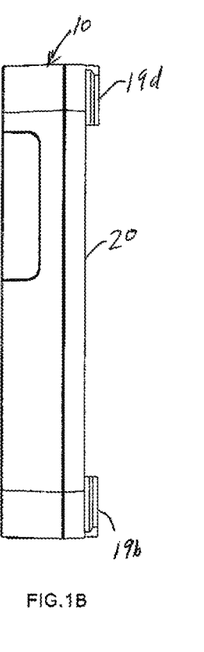
FIG. 1B is a side view of the switching Vdc power supply.
Figure 1C:
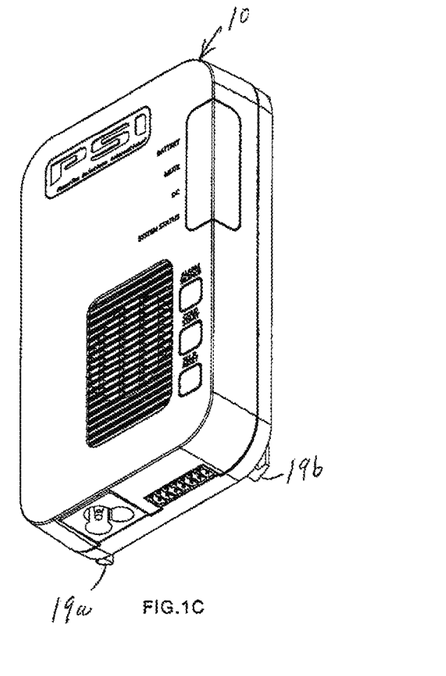
FIG. 1C is a bottom perspective view of the switching Vdc power supply.
Figure 1D:
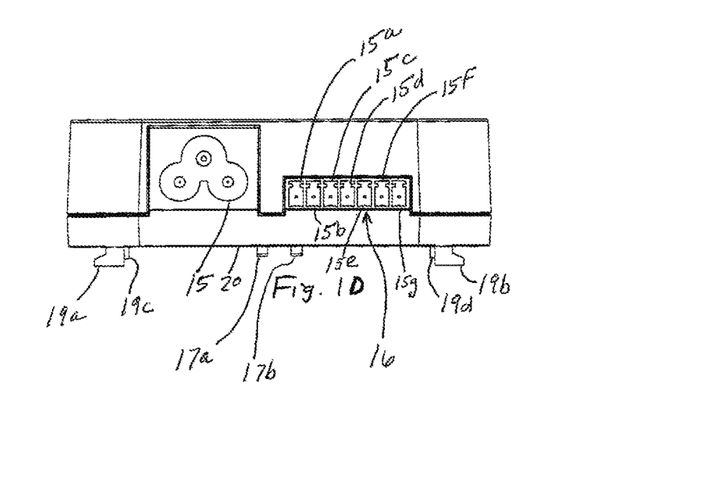
FIG. 1D is a bottom view of the switching Vdc power supply showing Vac input connection and Vdc output connection.
Figure 2:
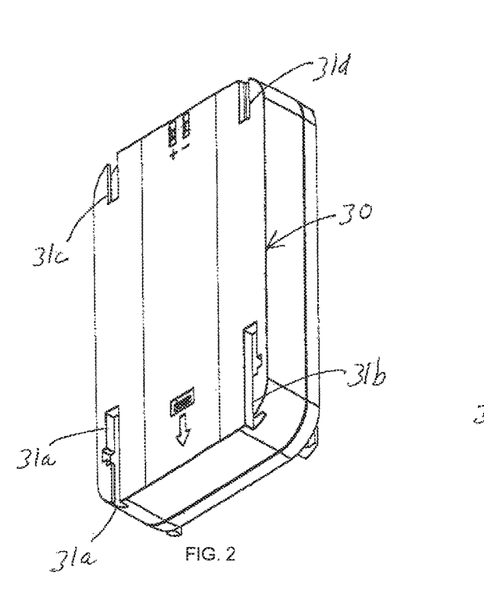
FIG. 2 is a rear perspective view of the Li Ion battery pack.
Figures 2A, 2B:
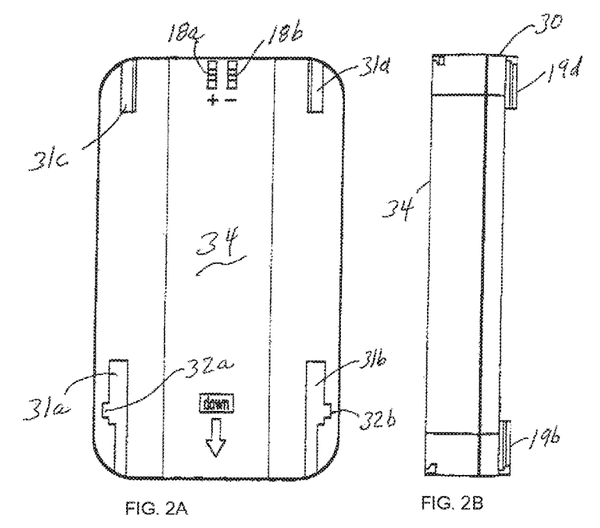
FIG. 2A is a rear view of the Li Ion battery pack design.
FIG. 2B is a side view of the Li Ion battery pack.
Figure 2C:
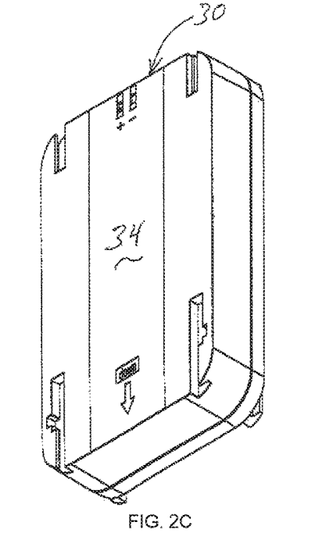
FIG. 2C is a perspective view of the Li Ion battery pack design.
Figure 2D:
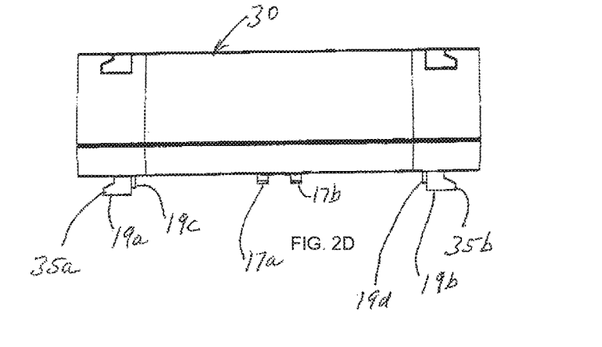
FIG. 2D is a bottom view of the Li Ion battery pack.
Figure 9:
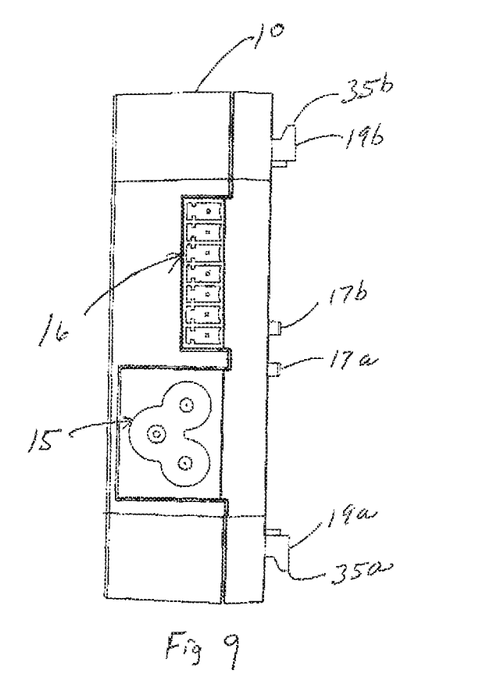
FIG. 9 is a bottom view of the switching Vdc power supply similar to FIG. 1C.

As seen in FIG. 1D and FIG. 9, the bottom of the power supply 10 includes an AC input power cord connector 15 for delivering the AC power to the power supply. Additionally the DC output and elementary connector 16 includes seven terminal connector pins. Pins 15a and 15b provide the output power to the CPE device. Pins 15c, 15d, 15e, 15f and 15g are used for communications between the powers supply 10 and the CPE device (not shown).

Battery pack protruding spring loaded terminals 17a and 17b provide connections for electrical communication between battery packs 30, as well as communication between the battery packs 30 and the power supply 10.

In reference to the drawings and, in particular, FIGS. 2, 2A-2D, the optional Li Ion battery pack 30 is shown to include contact terminals 18a and 18b on the front of battery pack 10 which engage and electrically connect to terminals 17a and 17b. Likewise, battery pack 10 has on its rear side terminals 17a, 17b to connect to the next battery pack, if installed. The front side female contact terminals 18a and 18b connect to switching Vdc power supply or partnering Li Ion battery pack. Back side male contact terminals 17a and 17b connect to a partnering Li Ion battery pack.

Figure 3:
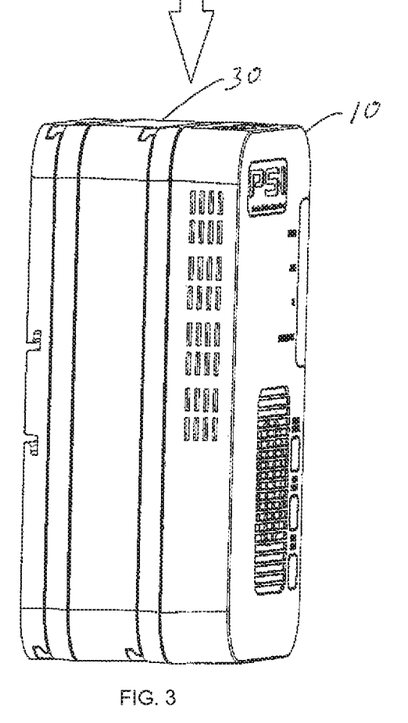
FIG. 3 is a side perspective of the switching Vdc power supply with attached, single Li Ion battery pack, working together as an uninterruptable power supply.
Figure 3A:
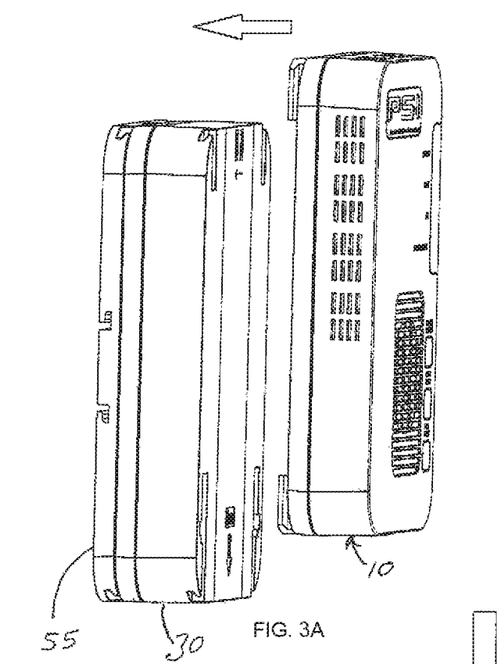
FIG. 3A is step 1 of an illustration for connecting a second switching Vdc power supply to single Li Ion battery pack.
Figure 3B:
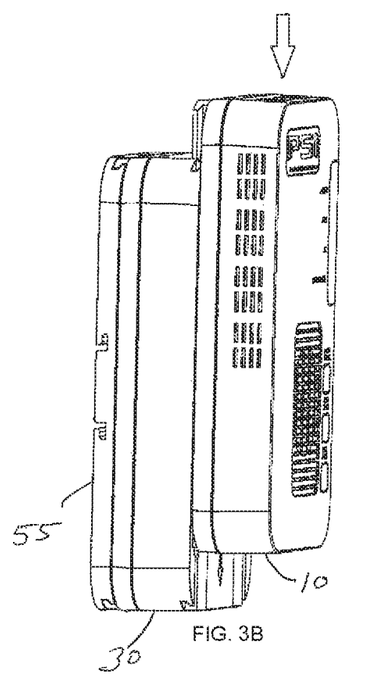
FIG. 3B is step 2 of an illustration for connecting a second switching Vdc power supply to single Li Ion battery pack.

In reference to the drawings and, in particular, FIG. 3, 3A-3B, the switching Vdc power supply 10 allows for optional attachable, single Li Ion battery pack 30 to be connected and operational for standard standby capacity.

Figure 4:
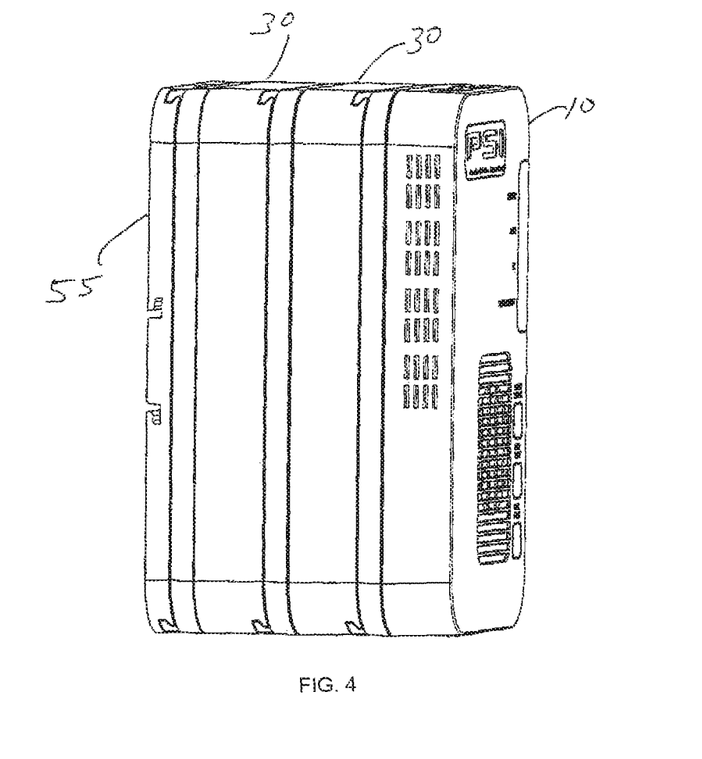
FIG. 4 is a side perspective view of a switching Vdc power supply with attached, multiple Li Ion battery packs (stacked battery packs), working together as an uninterruptable power supply.
Figure 4A:
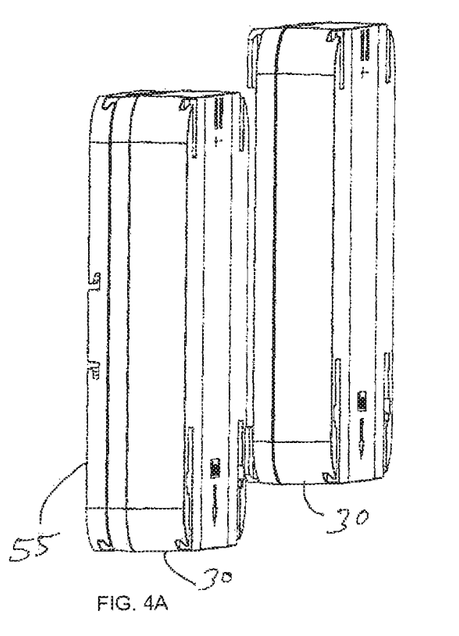
FIG. 4A is step 1 of an illustration for connecting switching multiple Li Ion battery packs.
Figure 4B:
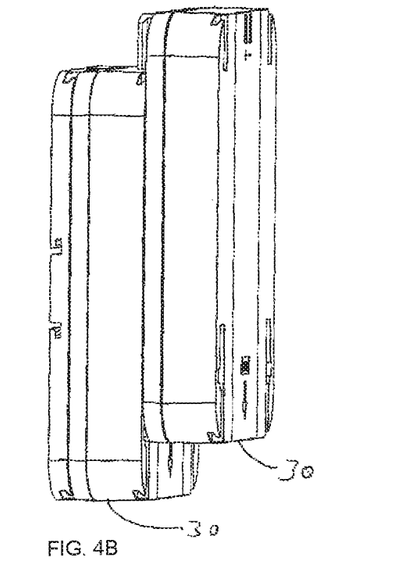
FIG. 4B is step 2 of an illustration for multiple Li Ion battery packs connected prior to connecting switching Vdc power supply.
Figure 5:
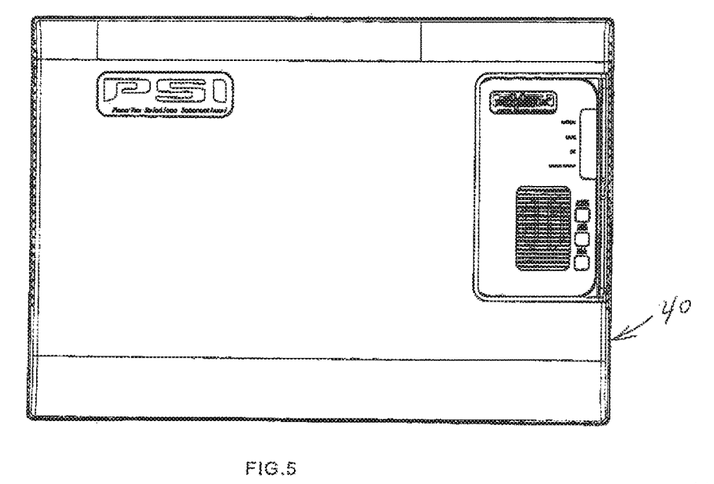
FIG. 5 is a front view of the universal enclosure with installed switching Vdc power supply.
Figure 5A:
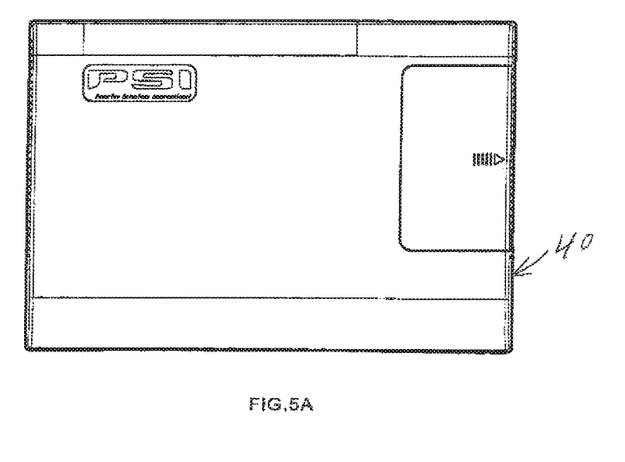
FIG. 5A is a front view of the universal enclosure with installed switching Vdc power supply.
Figure 5B:
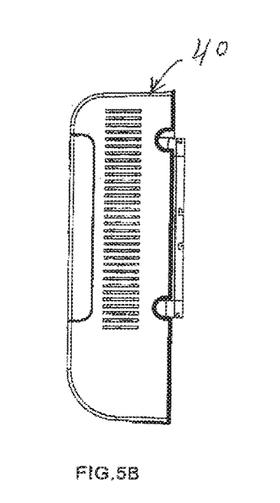
FIG. 5B is a side view of the universal enclosure with installed switching Vdc power supply.
Figure 5C:
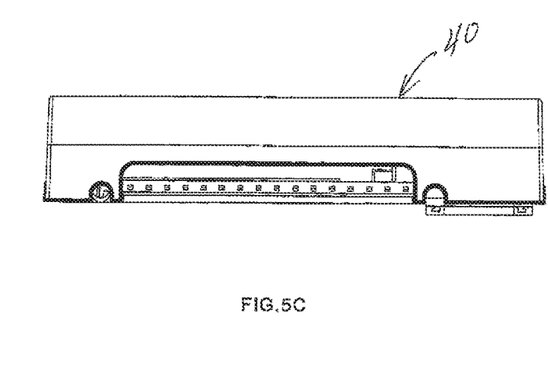
FIG. 5C is a bottom view of the universal enclosure with installed switching Vdc power supply.
Figure 5D:
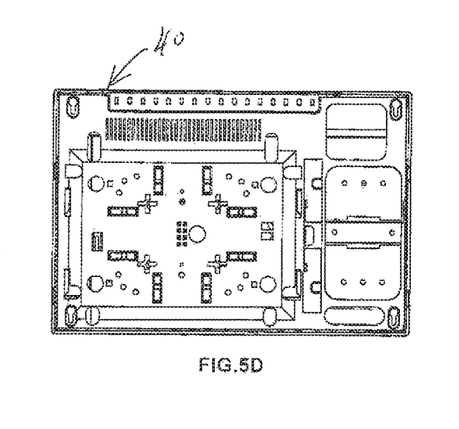
FIG. 5D is a back view of the universal enclosure with installed switching Vdc power supply.

In reference to the drawings and, in particular, FIGS. 4, 4A-4B, the switching Vdc power supply 10 allows for optional attachable, multiple Li Ion battery packs 30 to be connected and operational for increased standby battery capacity. The term "stacking" is used herein to indicate that multiple battery packs 30 are attached to the power supply 10.

As can be seen in the FIGS. 1A through 4B, battery packs 30 attached to power supply 10 and battery packs 30 attached to one another. As seen in FIG. 1D four connector feet 19a, 19b, 19c and 19d are located on the rear portion 20 of power supply 10 and on the rear portion 33 of battery pack 30. These feet 19a, 19b, 19c and 19d connect to grooves 31a, 31b, 31c and 31d located on the front portion 34 of battery pack 30. Feet 19a and 19b have a key 30a and 35b that fit and lock into notches 32a and 32b.

Power supply 10 has visual indicators with LED lights, for the battery LED 37 indicating service or replace battery or battery is not installed, mute LED 38 which indicates when flashing—audible alarm silence for 24 hours and when solid and audible alarm silence until manually enabled. LED DC 39 indicates the power supply is working off standby power. System status LED 50 indicates the power supply is receiving AC power load to operate under normal conditions.

As seen in FIG. 3A a base protective plate 55 interfaces between the wall mount area and either a power supply 10 or a battery pack 30 mounting the system of either the power supply 10 for the combination of the power supply 10 with battery pack 30 to the wall.

In reference to the drawings and, in particular, FIGS. 5, 5A-5D, a universal enclosure 40 allows for an "All-In-One" solution to house multiple variation and size CPE devices with switching Vdc power supply and optional Li Ion battery pack, as well as all input/output cabling to all active equipment. The universal enclosure can vary in size, however in a preferred embodiment it is approximately 24 inches wide 18 inches tall with a depth of 4 inches.

Figure 6:
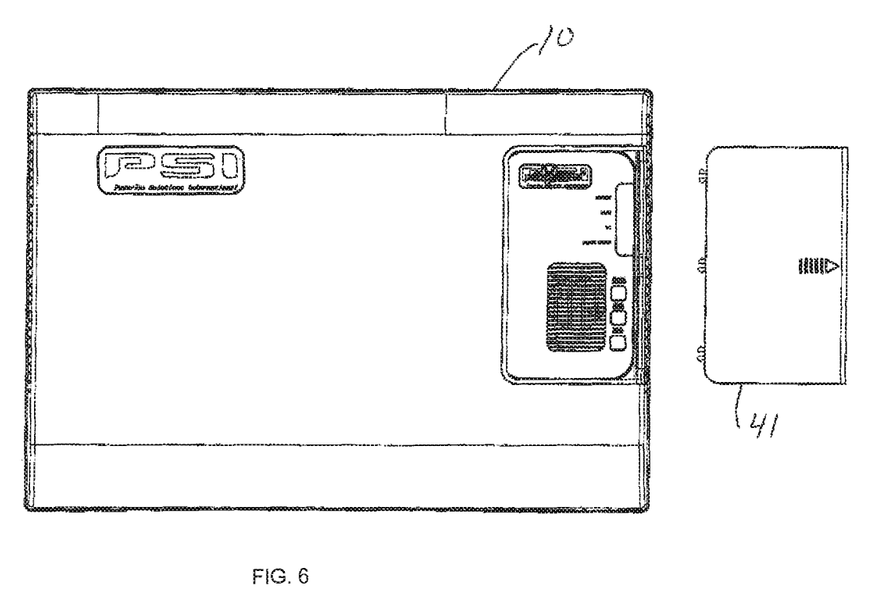
FIG. 6 is a front view of the universal enclosure with installed switching Vdc power supply illustrating the removable access window separated from the enclosure, with direction arrow to slide the removable access window back into the universal enclosure. When the removable access window is removed access is provided to operate control buttons on switching Vdc power supply.

In reference to the drawings and, in particular, FIG. 6, the universal enclosure 40 offers a removable access window 41 to allow the end user access to control buttons on switching Vdc power supply 10.

Figure 7:
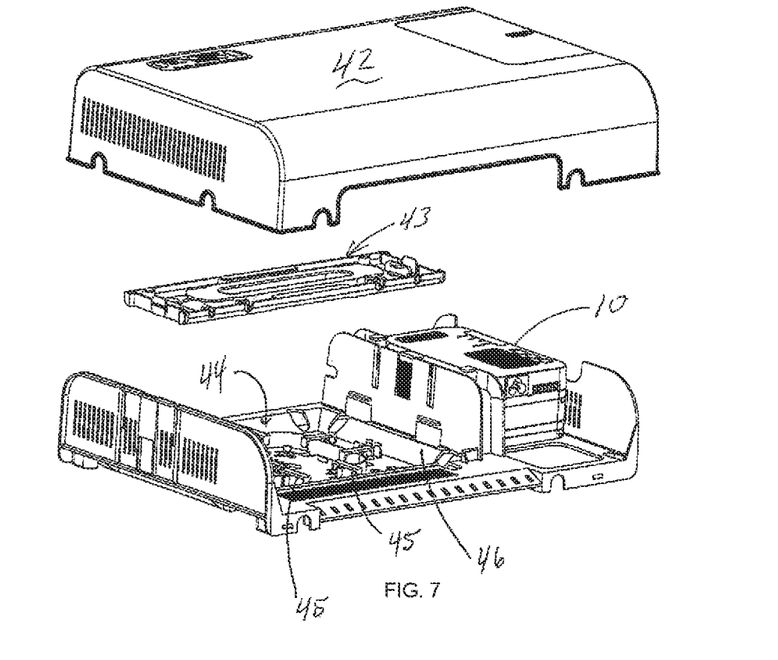
FIG. 7 is an exploded view of the universal enclosure (cover and internal structure) with installed switching Vdc power supply, the floating slack to a four fiber optic cable, illustrating the area for internal cable management and CPE device cavity.
Figure 8:
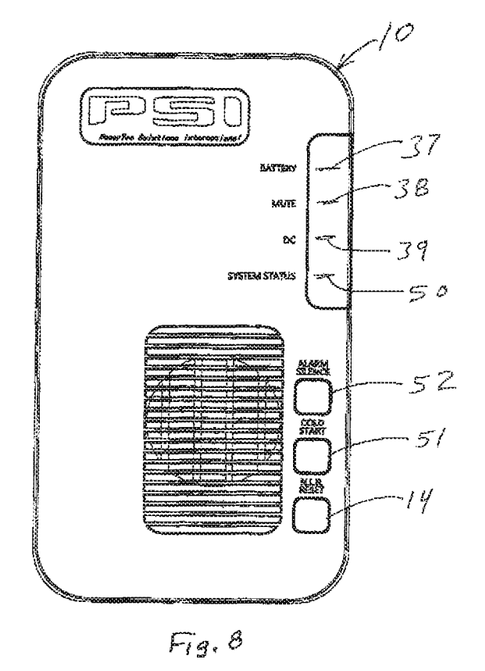
FIG. 8 is a front view of the switching Vdc power supply similar to FIG. 1A.

In reference to the drawings and, in particular, FIG. 7, the universal enclosure 40 offers a removable, protective cover 42 with internal CPE device "universal" cavity, Cable Management floating slack tray 43 and custom switching Vdc power supply recessed cavity area 44 with several wire supports 45 within the cavity area 44. The cavity area 44 has slanted walls 46 about the periphery of the cavity area 44.

The present invention provides a "universal" enclosure to accept and securely house multiple variations of manufactured CPE devices of differing shapes and sizes with complimenting removable cover and access window.

The universal enclosure recited is designed with a movable fiber management tray to accommodate multiple CPE devices with variations in depth measurements.

The universal enclosure is designed with the combined solution to house the CPE device, fiber management and complimenting switching Vdc power supply and optional, attachable Li Ion battery pack(s).

The universal enclosure is designed with an "access window" allowing the end user the ability to access switching Vdc power supply "control buttons" without removing the universal enclosure cover.

The universal enclosure is custom designed to accommodate the world's smallest, scalable telecommunications switching Vdc power supply with attachable Li Ion battery pack(s) to offer an All-In-One enclosure to house CPE device and switching Vdc power supply with attachable battery pack comprised of Lithium Chemistry battery cells.

The switching Vdc power supply, is designed with network interface reset function, allowing push button disconnect/reconnect of Vdc output voltage to CPE device.

The switching Vdc power supply, is designed with "cold start" function, allowing push button reconnect of Vdc output voltage to the UPS and CPE device.

A modular switching Vdc power supply with removable, attachable lithium-based cell battery pack(s) is described. Wherein the switching Vdc power supply can operate as a standalone switching Vdc power supply under standard operation (Vac voltage is present) or operate from attached lithium based battery pack(s). When connected as a "system", the battery pack(s) and switching Vdc power supply are attached and functioning under normal conditions (Vac voltage is present), the lithium based battery pack(s) shall auto-initiate standby services when loss of Vac voltage is present. Also there shall be no interruption in Vdc output from the switching Vdc power supply when Vac voltage input is interrupted or disconnected.

The switching Vdc power supply will accept and operate with input Vac voltage of 100Vac-240Vac.

The switching Vdc power supply will accept and operate with multiple connected, stacked, lithium chemistry battery pack(s).

The battery pack will be designed within a housing and is comprised of at least one lithium-based rechargeable cell within said housing.

The switching Vdc power supply shall operate as a stand-alone power supply, without Li Ion battery pack, or with one or multiple Li Ion battery packs as a scalable, portable uninterruptable power supply.

The total discharging amount of each lithium-based cell in the battery pack typically can be from one (1) Ah to 5000 Ah, and charging voltage per one cell is 3.0 to 4.2 V. 2. A battery pack having the lithium-based cell is selected from the group consisting of LiCoO2, LiMn2O4, LiNiCoAlO2, LiNiMnCoO2, and Li4Ti5O12 cells.

A battery pack is described wherein the battery pack includes multiple lithium-based rechargeable cells in series and/or in parallel in the housing. A battery pack is provided, wherein the battery pack includes an even number of lithium-based rechargeable cells in the housing. A battery pack further includes a protection circuit board within the housing. A battery pack is provided wherein the protection circuit board is a cut-off board or a cell balancing circuit board. A battery pack is provided wherein the protection circuit board offers temperature monitoring and safety cut-off.

The "uninterruptable power supply" is portable for remote or local use as well as mobile, scalable standby Vdc power capabilities utilizing Lithium Cell Chemistries.

In summary, the present invention is a switchable direct current voltage power supply for powering a device having an uninterruptible power supply with additional standby power capacity having a switching power supply having a power input, the switching device having a power output for powering a device and having a first power pack attachable to the switching power supply for providing power to the device when the power input fails; and a second power pack attachable to the first power supply providing additional standby power capacity.

Additionally the switchable direct current voltage power supply has an attachable power pack that utilizes lithium chemistry.

We claim:

1. A direct current (DC) voltage power supply for powering a device, including an expandable, uninterruptible power supply, comprising:
a power supply including an alternating current (AC) power input and a direct current (DC) power output, said power supply including a first set of connection terminals and at least one of feet or grooves;
a first external battery pack with at least one battery;
said first external battery pack including a second set of connection terminals accessible from a first side of said first external battery pack, and at least the other one of feet or grooves accessible from said first side;
said power supply and said first external battery pack configured to removably interconnect with one another, by mating said at least one of feet or grooves of the power supply with said at least the other one of feet or grooves of the first external battery pack, to electrically connect said first set of connection terminals with said second set of electrical contacts, in order to charge said at least one battery from said DC power output and to provide DC power from said at least one battery to said power supply when said AC power input fails;
said first external battery pack including a third set of connection terminals at a second side of said first external battery pack, opposite said first side, and at least one of feet or grooves at said second side, said third set of connection terminals and said at least one of feet or grooves configured to interconnect with, and electrically connect to, another external battery pack, in order to provide DC power to, or receive DC power from the another external battery pack.

2. The direct current voltage power supply as set forth in claim 1, wherein said battery includes a lithium-based cell.

3. A modular, stacking uninterruptible power backup system for powering a device, the system comprising:
a modular power supply having an alternating current (AC) power input, a DC power output for providing power to the device and a first connector of a first type on a first face of said modular power supply;
a modular, first external battery pack including a second connector of a second type, different from said first type, on a first face of said first external battery pack, said second type of connector being configured to mate with, and electrically interconnect to, said first type of connector, said first external battery pack removably connected to said modular power supply to provide a DC output to charge at least one battery of said first external battery pack, and to provide DC power from said at least one battery to said modular power supply when said power input fails;
said modular first external battery pack including, on a second face of said first external battery pack opposite said first face, a third connector of said first type configured to electrically interconnect with another modular external battery pack at said second face of said first external battery pack;
at least said power supply and said first external battery pack being removably connected in an aligned stack, with said first connector of said power supply detachably connected to said second connector of said first external battery pack.

4. The system according to claim 3, wherein said first face of said power supply and said first face of said first external battery pack include inter-connecting feet and grooves to releaseably attach said first external battery pack to said power supply with said first connector mated with said second connector.

5. The system according to claim 4, further including a modular second external battery pack, wherein said second face of said first external battery pack and a first face of said second external battery pack include inter-connecting feet and grooves to releaseably attach said second external battery pack to said first external battery pack in an aligned stack with said first external battery pack.

6. A method for increasing the standby battery capacity of a modular, uninterruptible power backup system, the method comprising the steps of:
providing a modular power supply including an AC power input, a DC power output for providing a DC output to a device and a first electrical connector of a first type on a first face of the modular power supply, the first face including at least one mechanical connector;
providing a first external battery pack including a second electrical connector of a second type on a first face and a third electrical connector of the first type on a second face opposite the first face, the first face and second face each including at least one mechanical connector, the at least one mechanical connector on the first face of the first external battery pack configured to mate with the at least one mechanical connector on the first face of the power supply, the first external battery pack additionally including, on a second face of the first external battery pack opposite the first face, a third electrical connector of a first type including at least one mechanical connector configured to mate with a mechanical connector of another modular external battery pack;
stacking the first external battery pack with the power supply by mating the at least one mechanical connector of the power supply with the at least one mechanical connector on the first face of the first external battery pack to removably attach the first external battery pack to the power supply in a stacked configuration with the first electrical connector mated with the second electrical connector; and
applying an AC power input to the modular power supply to produce a DC power output, the DC power output being provided to the device and to at least one battery of the first external battery pack for charging, via the interconnection of the first and second electrical connectors, and to provide power from the at least one battery to the modular power supply when the power input fails.

7. The method of claim 6, further comprising the step of stacking another external battery pack with the first external battery pack and power supply by mating at least one mechanical connector on the another external battery pack with the at least one mechanical connector on the second face of the first external battery pack.

8. The method of claim 6, wherein each at least one mechanical connector is selected to be at least one of a foot or an interlocking groove configured to removeably engage a foot.

9. A modular external battery pack, comprising:
at least one battery;
a housing containing said at least one battery, said housing including a first face and a second face opposite said first face;
said housing including, on said first face, a first electrical connector, and at least one mechanical connector of a first type;
said housing including, on said second face, a second electrical connector, and at least one mechanical connector of a second type different from said first type, and said at least one mechanical connector of said first type configured to mechanically interlock with a mechanical connector of said second type.

10. The battery pack of claim 9, wherein said at least one battery includes a lithium battery.

11. The battery pack of claim 9, wherein said first electrical connector is of a first type and said second electrical connector is of a second type different from said first type, and said first type of electrical connector is configured to mate with an electrical connector of said second type.

12. The battery pack of claim 11, wherein said first electrical connector of said first type include protruding spring loaded terminals and said second electrical connector of said second type includes female contact terminals is configured complementary to, and to mate with, an electrical connector of said first type.

13. The battery pack of claim 9, wherein each at least one mechanical connector is selected to be at least one of a foot or an interlocking groove configured to removeably engage a foot.

14. A direct current (DC) voltage power supply for powering a device, including an expandable, uninterruptible power supply, comprising:
at least one external battery pack according to claim 9;
a power supply including an alternating current (AC) power input and a direct current (DC) power output; and
said power supply including a third electrical connector of said first type and at least one mechanical connector of said first type, said third electrical connector electrically connected to said second type of electrical connector of the at least one external battery pack, and said at least one mechanical connector of said first type of said power supply mated to said at least one mechanical connector of said second type of said external battery pack.

15. The power supply of claim 14, wherein said at least one external battery pack is a plurality of identical battery packs interlocked with one another and with said power supply.

16. A direct current (DC) voltage power supply for powering a device, including an expandable, uninterruptible power supply, comprising:
   at least one external battery pack according to claim 9;
   a power supply including an alternating current (AC) power input and a direct current (DC) power output;
   a base protective plate configured to interface between a wall mount area and either said at least one external battery pack or said power supply;
   said power supply including a third electrical connector of said first type and at least one mechanical connector of said first type, said third electrical connector configured to electrically connect to an electrical connector of said second type, and said at least one mechanical connector of said first type of said power supply configured to mate with said at least one mechanical connector of said second type of said external battery pack or a mechanical connector of said base protective plate.

* * * * *

(12) POST-GRANT REVIEW CERTIFICATE (227th)

United States Patent
Battat et al.

(10) Number: US 10,714,954 J1
(45) Certificate Issued: Mar. 9, 2022

(54) PORTABLE SWITCHING POWER SUPPLY WITH ATTACHABLE BATTERY PACK AND ENCLOSURE

(71) Applicants: Stanley Battat; Drew M. Hardin

(72) Inventors: Stanley Battat; Drew M. Hardin

(73) Assignee: POWERTEC SOLUTIONS INTERNATIONAL LLC

Trial Number:

PGR2021-00070 filed Mar. 22, 2021

Post-Grant Review Certificate for:

Patent No.: 10,714,954
Issued: Jul. 14, 2020
Appl. No.: 16/799,343
Filed: Feb. 24, 2020

The results of PGR2021-00070 are reflected in this post-grant review certificate under 35 U.S.C. 328(b).

POST-GRANT REVIEW CERTIFICATE
U.S. Patent 10,714,954 J1
Trial No. PGR2021-00070
Certificate Issued Mar. 9, 2022

AS A RESULT OF THE POST-GRANT REVIEW PROCEEDING, IT HAS BEEN DETERMINED THAT:

Claims 1-16 are cancelled.

\* \* \* \* \*